Dec. 8, 1942.    W. L. ERICKSON    2,304,249
DETACHABLE TRUCK UNLOADER
Filed Nov. 10, 1941    3 Sheets-Sheet 1
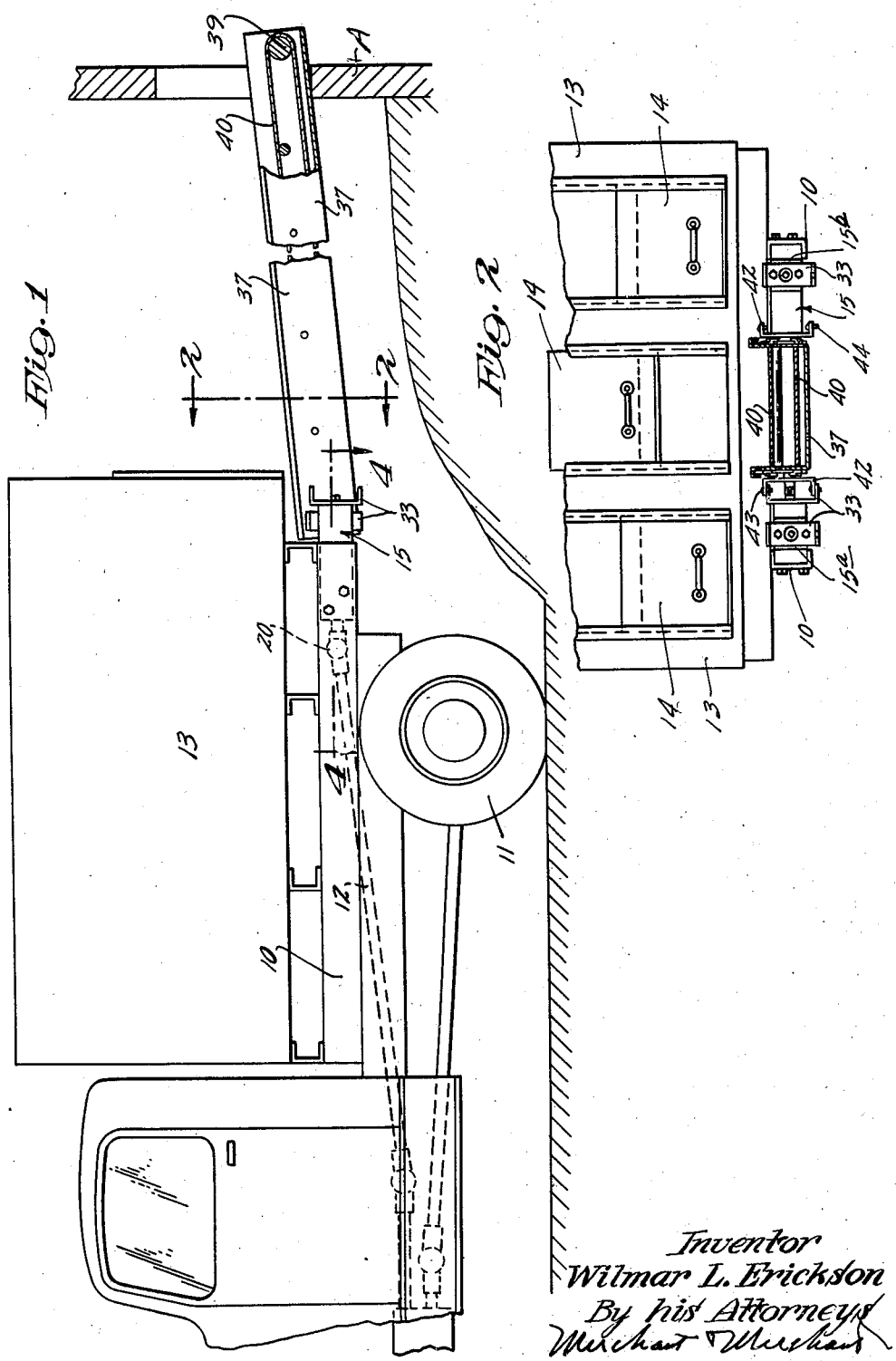
Inventor
Wilmar L. Erickson
By his Attorneys
Merchant & Merchant Dec. 8, 1942. W. L. ERICKSON 2,304,249
DETACHABLE TRUCK UNLOADER
Filed Nov. 10, 1941 3 Sheets-Sheet 2

Inventor
Wilmar L. Erickson
By his Attorneys
Michant & Michant

Dec. 8, 1942.  W. L. ERICKSON  2,304,249
DETACHABLE TRUCK UNLOADER
Filed Nov. 10, 1941  3 Sheets-Sheet 3
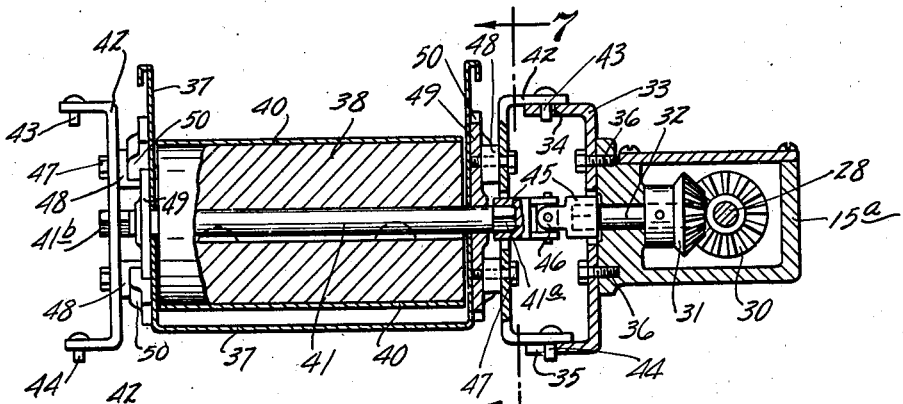
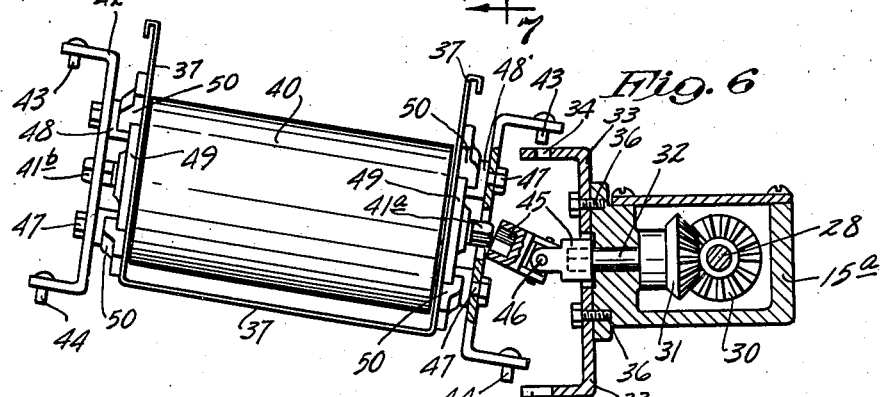
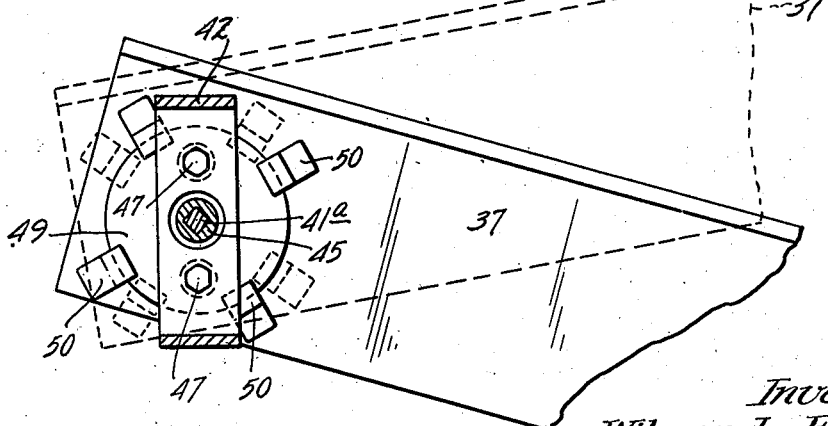
Inventor
Wilmar L. Erickson
By his Attorneys
Merchant & Merchant Patented Dec. 8, 1942

2,304,249

UNITED STATES PATENT OFFICE 2,304,249

DETACHABLE TRUCK UNLOADER

Wilmar L. Erickson, Robbinsdale, Minn.

Application November 10, 1941, Serial No. 418,484

3 Claims. (Cl. 214—83)

My invention provides a simple and highly efficient truck unloader especially adapted for use in connection with trucks that carry and deliver granular or crumbled material such as coal, grain, sand, gravel, etc. The general objects of the invention are simplicity of construction, convenience in application and removal of the unloader, and high efficiency in operation; and, generally stated, the invention consists of the novel devices, combinations of devices and arrangement of parts hereinafter described and defined in the claims.

A commercial form of the invention is illustrated in the accompanying drawings in connection with a truck provided with a load-carrying body provided at its rear or delivery end with laterally spaced gates for the discharge of the material onto the delivery attachment.

The delivery attachment involves a conveyor frame equipped with an endless belt and driving and guiding rollers therefor. As will hereinafter appear, the construction and arrangement is such that the carrier may be applied for the delivery of the material from the truck generally in a rearward direction or may be applied with the conveyor directed at a right angle to the truck either toward the right or toward the left as may be desired.

In the accompanying drawings, which illustrate the invention, like characters indicate like parts throughout the several views.

Referring to the drawings:

Fig. 1 is a view chiefly in side elevation, but with some parts sectioned, showing the conveyor applied for the delivery of the materials directly rearward and into the receiving bin or receptacle;

Fig. 2 shows the truck in rear elevation with parts broken away and with parts of the conveyor sectioned approximately on the line 2—2 of Fig. 1;

Fig. 5 is a section taken on the line 5—5 of Fig. 4, some parts being shown in full;

Fig. 6 is a view corresponding to Fig. 5 but showing the conveyor partly detached from the truck; and Fig. 7 is a section taken on the line 7—7 of Fig. 5.

Figure 3:
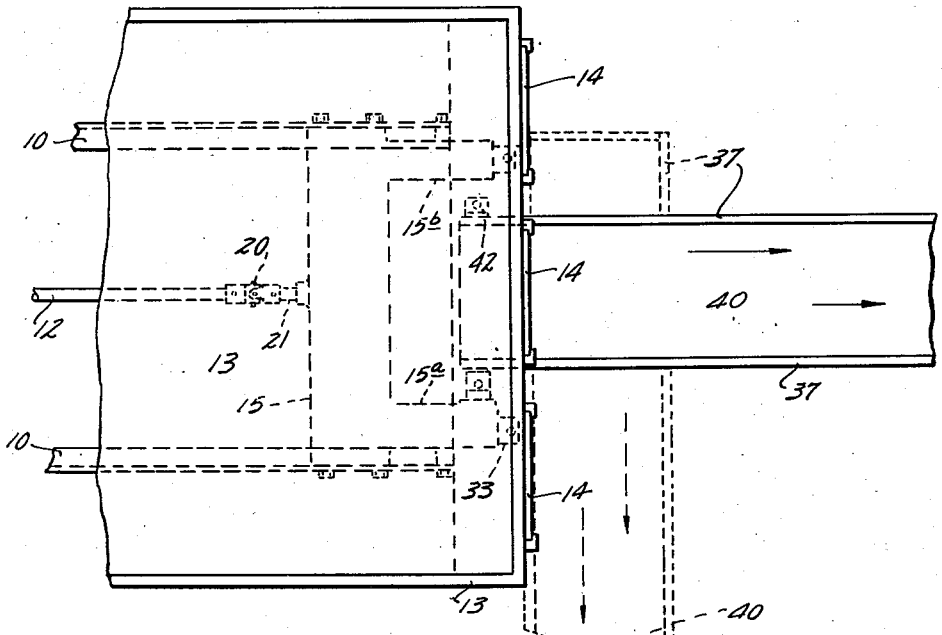
Fig. 3 is a plan view, with parts broken away, showing in full lines the parts adjusted as shown in Fig. 1.

Of the parts of the truck illustrated, the numeral 10 indicates the main beams of the truck frame, the numeral 11 indicates the rear truck wheels, the numeral 12 indicates the power take-off shaft, and the numeral 13 indicates the box-like truck body which is provided at its rear end with discharge openings adapted to be opened and closed, at will, by gates 14 located one at the transverse center and one at each side thereof.

Rigidly secured to the truck main beams 10, by machine screws or other suitable means, is a substantially U-shaped hollow gear box 15, preferably a cast iron structure, formed with laterally spaced forwardly projecting portions 15a and 15b.

Extended transversely through the main body portion of the gear box 15 and journaled in the ends thereof is a power take-off shaft 16 provided near its ends with reversely facing beveled or miter gears 17. Mounted on the intermediate portion of the shaft 16 is a pair of spaced miter gears 18 shown as secured to a common hub 19 that is keyed to rotate with shaft 16 but free for sliding movements thereon.

The rear end of power shaft 12, preferably by a knuckle joint 20, is connected to a short shaft 21 that is journaled in a suitable bearing on the rear portion of gear box 15 and is provided with a bevel gear 22 that normally meshes with the right hand gear 18. The hubs of gears 18 are grooved and engaged by the prongs or pins of the transversely movable shipper bracket 23 that has an extended arm 24 that works through a slot 25 in the rear wall of the gear box and is provided with a latch dog 26 that is engageable with either of two depressions or lock notches 27 in the said rear wall of the gear box. Extended through and journaled in the laterally spaced extensions 15a and 15b, respectively, of gear box 15, are laterally spaced parallel shafts 28 and 29. Shaft 28, at its rear end, is provided with a bevel gear 28a that meshes with right hand bevel gear 17 and shaft 29 at its rear end is provided with a bevel gear 29a that meshes with left hand bevel gear 17. At its projecting front end shaft 28 has an angular shank 28b and shaft 29 at its forwardly projecting end is provided with an angular shank 29b.

Shaft 28, near its front end, is provided with a bevel gear 30 that meshes with a bevel gear 31 on a short transverse shaft 32 journaled in one wall of the gear box extension 15a. Shaft 32, at its exposed end, terminates in an angular shank 32a.

In the preferred form of this improved device I employ three channel iron or channel-shaped coupling brackets 33 formed in their upper flanges with lock pin holes 34 and in their lower flanges with lock pin-receiving notches 35. One of these coupling brackets 33 is rigidly secured by machine screws 36 or the like to the inner wall of gear box extension 15a, with the angular shank of shaft 32 projecting through the central portion thereof; another of these coupling brackets 33 is likewise rigidly secured to the rear wall of gear box extension 15a, with the shank 28a of shaft 28 projecting through the central portion thereof; and the third of these coupling brackets 33 is likewise rigidly secured to the rear end of gear box extension 15b with the shank 29b of shaft 29 projecting through the central portion thereof.

The conveyor frame 37 is preferably an elongated channel-shaped structure provided at its receiving end with a driving roller 38 and at its delivery end with a driven roller 39. A conveyor belt 40 runs over the rollers 38 and 39. Driving roller 38 is secured on a shaft 41 journaled in the sides of the frame 37 and provided at its projecting ends with angular shanks 41a and 41b, see particularly Figs. 5 and 6.

Pivotally secured to both the right and left hand sides of the receiving end of conveyor frame 37 are channel iron or channel-shaped coupling brackets 42 through the central portions of which the angular shanks 41a and 41b project. The upper flanges of the coupling brackets 42 are provided with lock or coupling pins 43 and the lower flanges of said coupling brackets are provided with depending coupling pins 44. As an intermediate coupling device to be used as hereinafter described, I employ a pair of coupling sockets 45 connected by a universal joint 46, best shown in Figs. 5 and 6.

The pivotal connection between the coupling brackets 42 and the sides of the receiving end of the carrier frame is preferably made as follows: The said brackets, by means of machine screws 47 or the like, are connected to angular projections 48 of discs 49 through the axes of which project the angular ends of shaft 41. Discs 49 are placed against the sides of the conveyor frame and are held against lateral movement but free for oscillatory movements by means of keeper lugs 50 secured on the sides of said frame 37.

*Operation*

Figure 4:
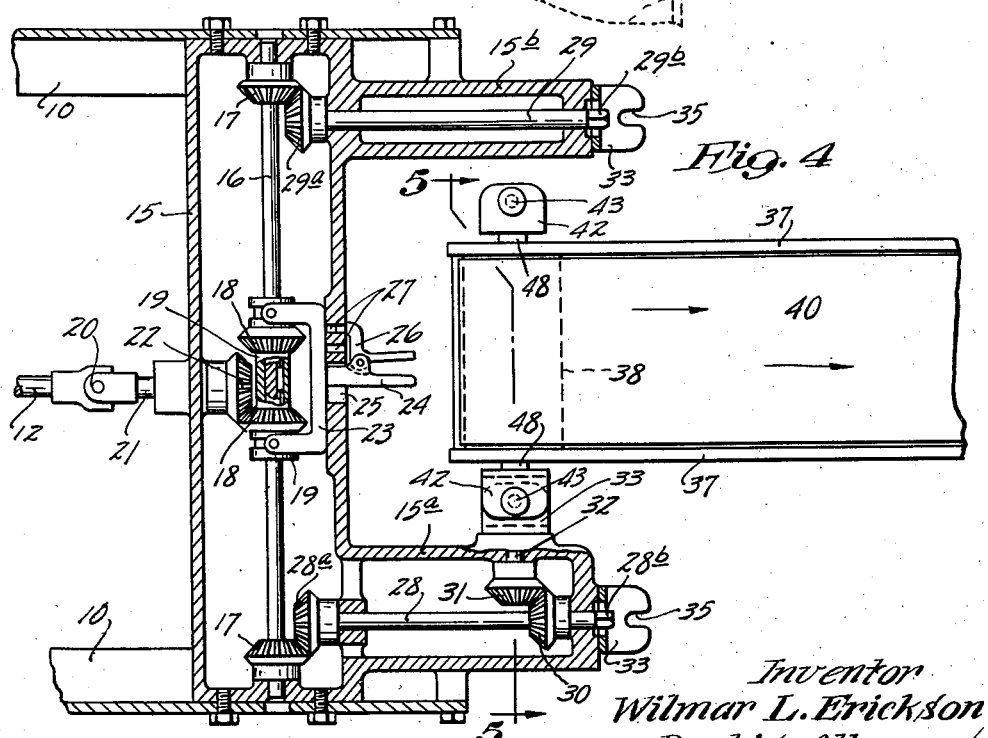
Fig. 4 is a plan view with parts broken away but with the parts chiefly sectioned approximately on the line 4—4 of Fig. 1.

In Fig. 4 the conveyor is shown as applied for direct rearward delivery of the material from the truck body. To couple the device for such delivery, the right hand coupling bracket 42 is connected to the intermediate fixed coupling bracket 33 by inserting the upper pin 43 into the hole 34 and the pin 44 into the notch 35 and when thus coupled, the parts will be held in coupled relation under the action of gravity. The intermediate universal coupling obviously is applied by slipping the one socket 45 onto the angular end 32a of shaft 32 and the other socket onto the angular end 41a of shaft 41, as best shown in Fig. 5. Fig. 6 shows the parts being assembled for coupling action.

When the conveyor is to be attached for delivery directly toward the right and at right angle to the axis of the truck, the device is connected in the same manner as described, except that the right hand coupling bracket 42 will be coupled to the bracket 33 which is on the rear end of gear box extension 15a. The dotted lines in Fig. 3 show the conveyor adjusted for delivery toward the right, as just stated; and here it will be noted that the delivery of the material from the truck body may be made by opening not only the intermediate gate but also the right hand gate.

When the conveyor is to be coupled for delivery directly toward the left, the coupling operation is the same as that described, except that in this case it will be the left hand coupling bracket 42 that will be coupled to the bracket 43 that is on the rear end of the gear box extension 15b; and when the conveyor is thus coupled up, delivery from the box may be made not only from the intermediate gate but from the left hand gate.

In Fig. 4 the reversely facing bevel gears are adjusted for driving the endless conveyor belt in a direction to convey material from the truck to a suitable point of delivery. To adapt the conveyor to carry material to the truck it is only necessary to shift the gears 18 so as to engage the left hand bevel gear with the driving bevel gear 22.

In Fig. 1 the conveyor is shown as adjusted for delivery into a bin or receptacle A.

What I claim is:

1. The combination with a power-driven take-off shaft, of a bearing frame having laterally spaced rearwardly projecting arms, of a transverse shaft journaled to the body portion of said bearing frame and having reversely facing bevel gears, means for driving said transverse shaft from said power take-off shaft, laterally spaced power delivery shafts journaled to the arms of said bearing frame and having bevel gears meshing with the bevel gears of said transverse shaft, a third power delivery shaft journaled to one of the arms of said bearing frame and gear connected to the adjacent power delivery shaft of the adjacent arm and extending at right angles to the latter, a conveyor frame having driving and driven rollers, a conveyor belt working over said rollers, said driving roller having a power-receiving shaft, means for connecting said power-receiving shaft, at will, to any one of the said three power delivery shafts, and means for detachably supporting the said conveyor frame in such coupled positions.

2. The structure defined in claim 1 in which said conveyor, when coupled in either of said positions, is capable of both lateral and vertical swinging movements.

3. The structure defined in claim 1 in which the means for coupling said conveyor frame in the position stated includes coupling brackets on the arms of said bearing frame and co-operating coupling brackets on the opposite sides of the receiving end of said conveyor frame, said coupling brackets having interlocking swinging engagement and gravity held in such interlocking engagement.

WILMAR L. ERICKSON.